Figure 1:
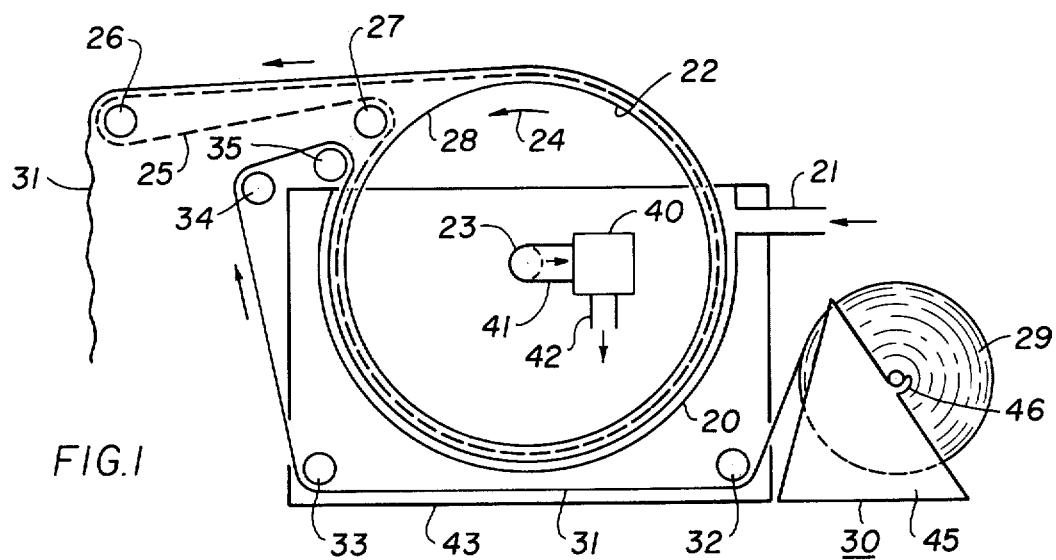

United States Patent [19]
Ball et al.

[11] 3,901,809
[45]*Aug. 26, 1975

[54] ROTARY FILTER APPARATUS HAVING CONTINUOUS WEB SUPPORTING A SHEET FILTER MEDIA

[75] Inventors: Harry Ball, Piscataway; Henry A. Steward, Califon, both of N.J.

[73] Assignee: Technical Fabricators, Inc., Piscataway, N.J.

[ * ] Notice: The portion of the term of this patent subsequent to Feb. 12, 1991, has been disclaimed.

[22] Filed: June 10, 1974

[21] Appl. No.: 477,812

[52] U.S. Cl. .................................................. 210/387
[51] Int. Cl. .......................................... B01d 33/12
[58] Field of Search .............. 210/65, 387, 401, 406

[56] References Cited
UNITED STATES PATENTS

| | | | |
|---|---|---|---|
| 2,823,806 | 2/1958 | Harlan | 210/387 |
| 3,206,030 | 9/1965 | Estabrook | 210/387 X |
| 3,651,946 | 3/1972 | Ball et al. | 210/387 |
| 3,791,527 | 2/1974 | Ball et al. | 210/387 |
| R24,430 | 2/1958 | Hornbostel | 210/387 |

Primary Examiner—Theodore A. Granger
Attorney, Agent, or Firm—Burgess, Ryan and Wayne

[57] ABSTRACT

A rotary filter apparatus has a rotary drum adapted to extend into a tank containing a slurry to be filtered. The outer periphery of the drum is perforated, and an endless web surrounds substantially the entire circumference of the drum, leaving a small exposed portion where the web extends generally horizontally to a roller spaced from a side of the tank wall. A sheet of a filter media is carried externally of the web, and a suction force is applied internally of the drum whereby solid materials in the slurry are deposited on the filter media. The filter media is disposable. Roller means are provided for holding the filter media separated from the outer wall of the tank. The drum may be either segmented to inhibit loss of suction through the exposed portion thereof, or may have a single chamber defined by the perforated outer wall thereof. In the latter case external means may be provided for stripping the web from the drum and inhibiting loss of vacuum to the exposed portion of the drum.

11 Claims, 12 Drawing Figures

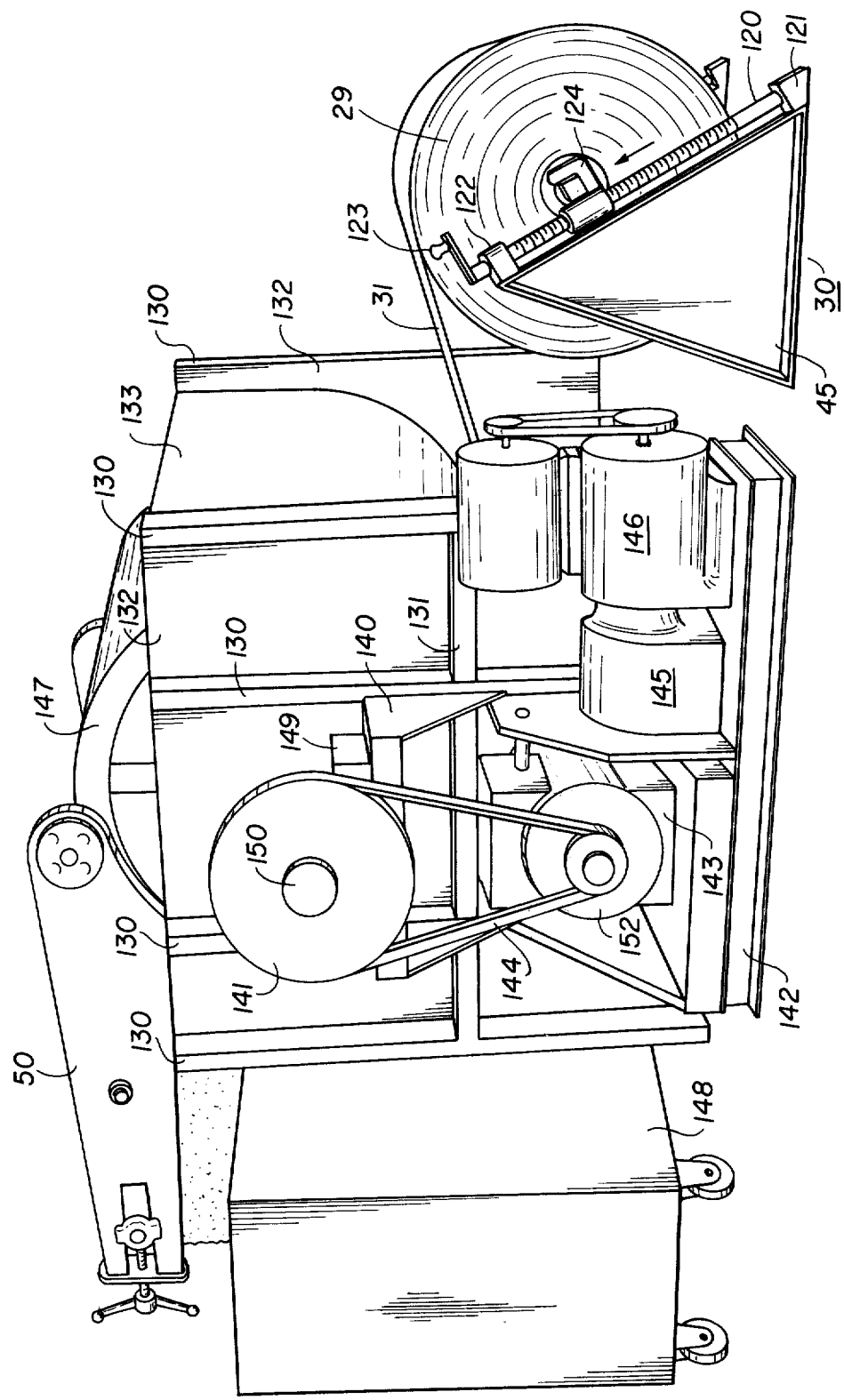

ROTARY FILTER APPARATUS HAVING CONTINUOUS WEB SUPPORTING A SHEET FILTER MEDIA

This invention relates to a rotary filter apparatus and is more particularly directed to improvement in a rotary filter of the type having a perforated drum immersed in a slurry to be filtered, the major portion of the perforated outer wall of the drum being surrounded by a continuous web which carries a disposable sheet filter media.

U.S. Pat. No. 3,791,527 discloses a filter apparatus in which a drum having a perforated outer wall is partially immersed for rotation in a tank of a slurry to be filtered. A continuous web surrounds the portion of the drum within the slurry, the web extending from the drum at a portion external of the slurry to a roller displaced from the side of the tank. A supply roll of a filter media, such as newsprint, is provided at the side of the tank, the filter media extending at least partially in contact with the tank for support, and thence round the drum on the outside of the continuous web. The web carries the filter media through the slurry, and thence to the external roller. At the external roller the filter media is separated from the web for disposal, as the continuous web is returned to the surface of the drum.

A filter apparatus of this type is extremely advantageous, since it enables filtering of materials which are very difficult to filter by other techniques. For example, the apparatus is suitable for filtering of slimy materials as well as slurries having a very low concentration of solids. In some other types of filters, in which the slurry is filtered onto a continuous non-disposable filter media, it is difficult to filter such materials since the solid materials, i.e., the "cake" cannot be removed continuously from the filter media. In the arrangement of the above U.S. patent, however, the slurry may be filtered even though it is of the type which cannot be discharged continually from a filter media. In the past, slurries of this type could only have been filtered from a practical standpoint by covering the perforated surface of a drum with a fabric, and then applying a layer of filter material in finely divided form, such as diatomaceous earth, powdered coal or perlite. Suction within the drum allowed the solids to build up on the surface of the filter media, and a scraper was required to shave the solids from the layer of filter material on the drum in a continuous action during filtration. In the course of time it is obvious that the coating in this form of filter apparatus requires replacement, and the consequent necessity of stopping the apparatus for a considerable period of time.

The present invention is directed to a filter apparatus of the type of the above patent, directed to improving the operation thereof. Thus, in the arrangement of the above patent, the filter media is directed to pass along the tank wall for support, prior to being fed into contact with the continuous web. It has now been found that, on occasion, condensation on the tank wall may result in wetting of the filter media, and if the filter media has a poor wet strength, such as newsprint, problems arise in the breakage of the paper. Consequently, in accordance with the present invention, means are provided for separating the filter media from the tank wall.

The invention is also directed to the provision of an improved guide arrangement for the continuous web and filter media of a filter apparatus of the type of the above patent. In addition, the invention is directed to the provision of an improved arrangement for stripping the web from the drum when a drum is employed of the type having a continuous suction chamber in contact with the perforated outer wall of the drum. Such stripping means is of course not required when the drum has segmented chambers adapted to be connected to a suitable valving structure for removing suction forces from the exposed portion of the drum.

Figure 2:
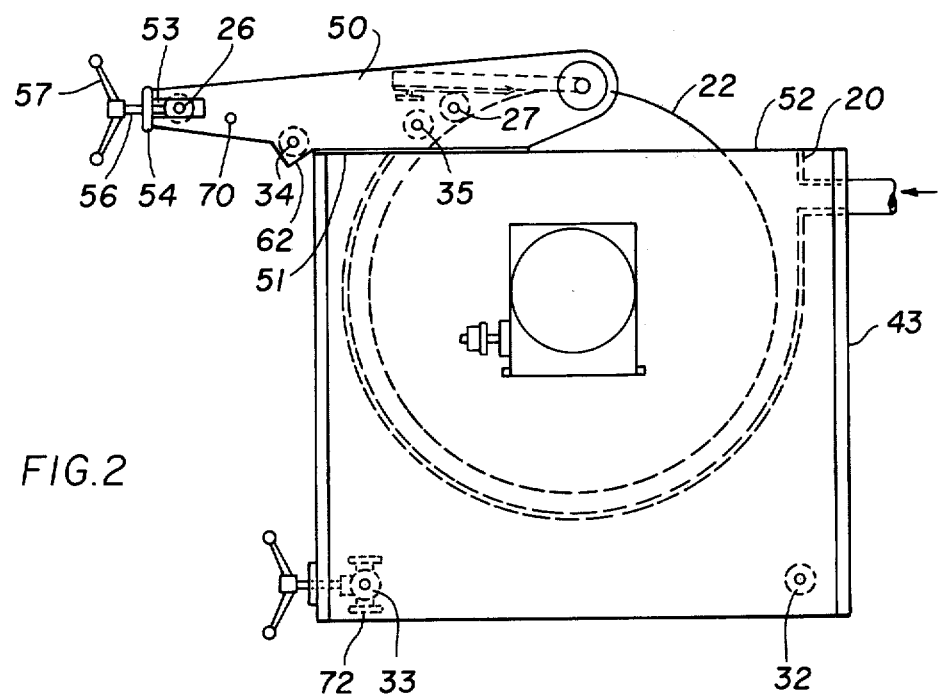
Figure 3:
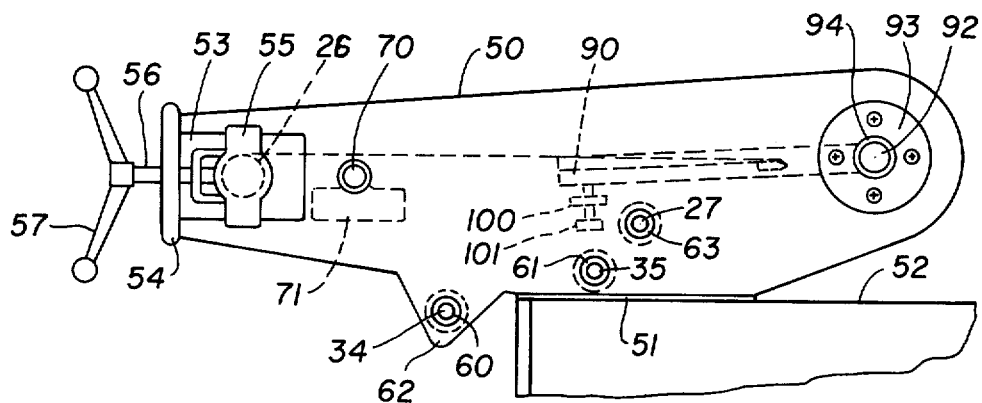
Figure 10:
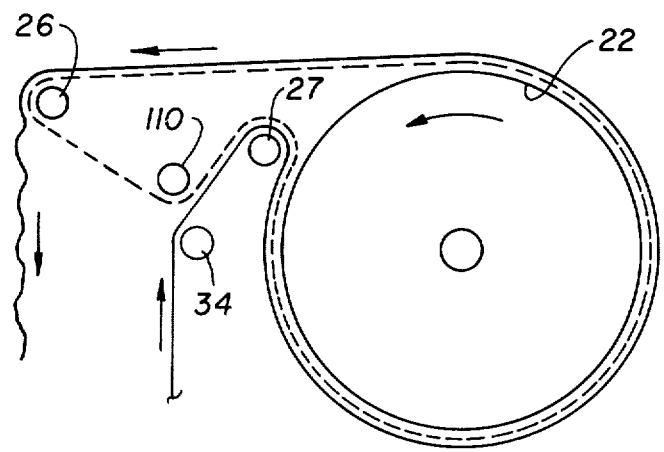
Figure 4:
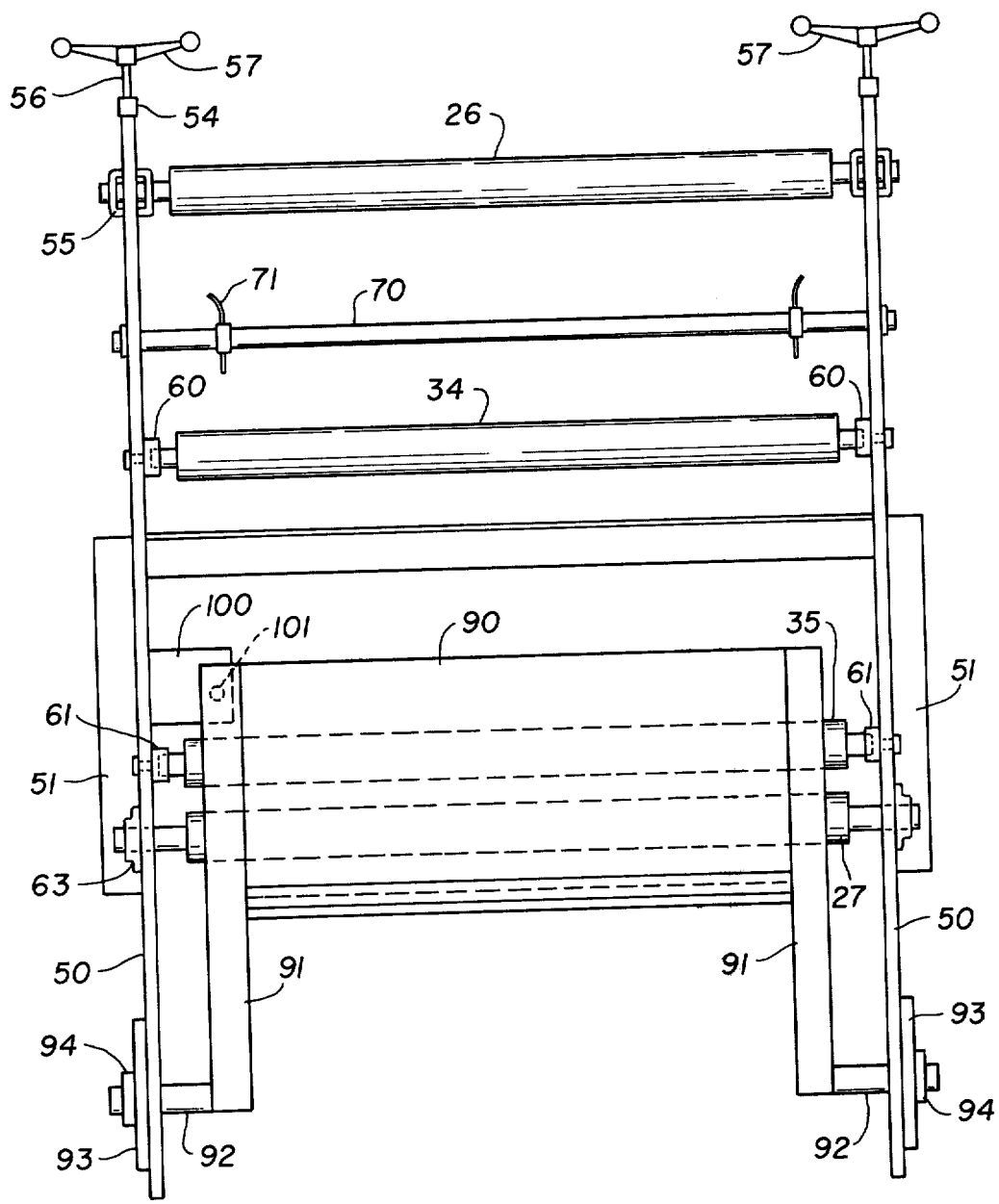
Figure 5:
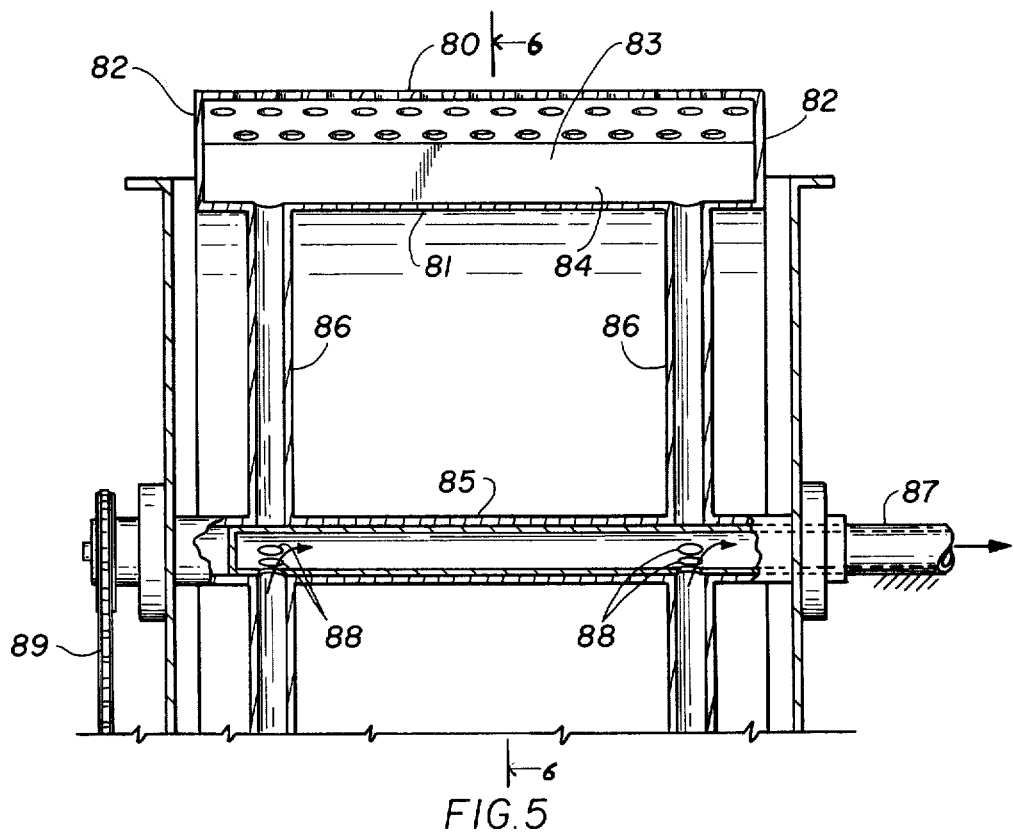
Figure 6:
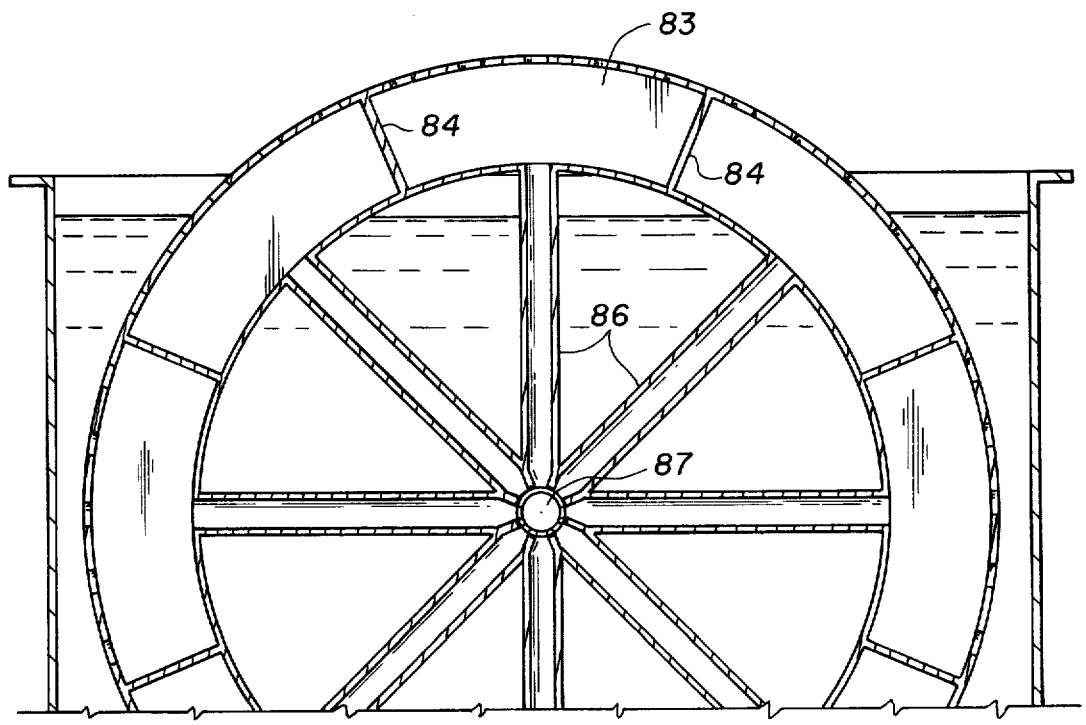
Figure 7:
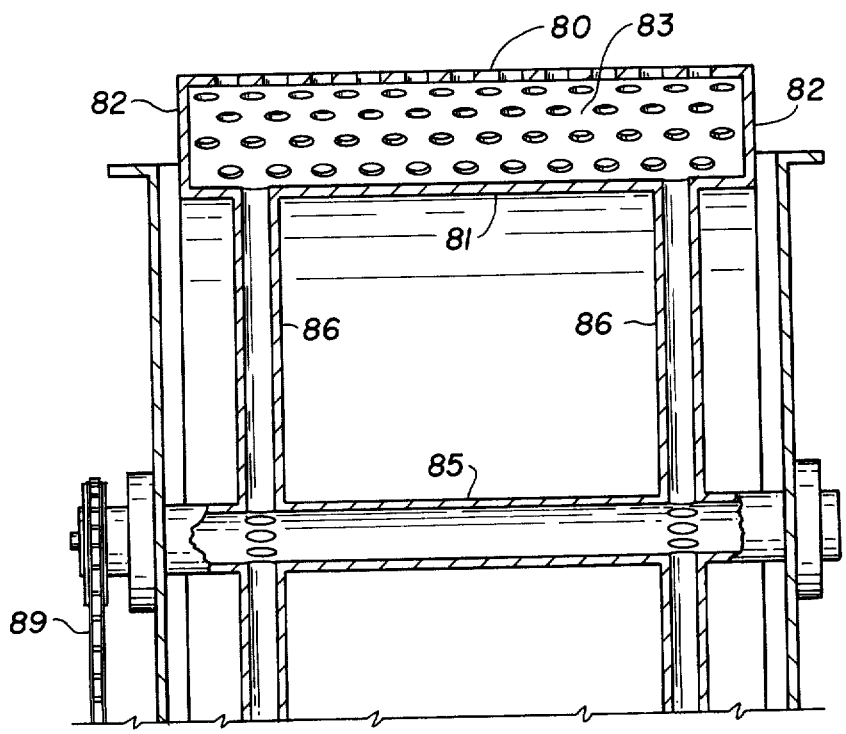
Figure 11:
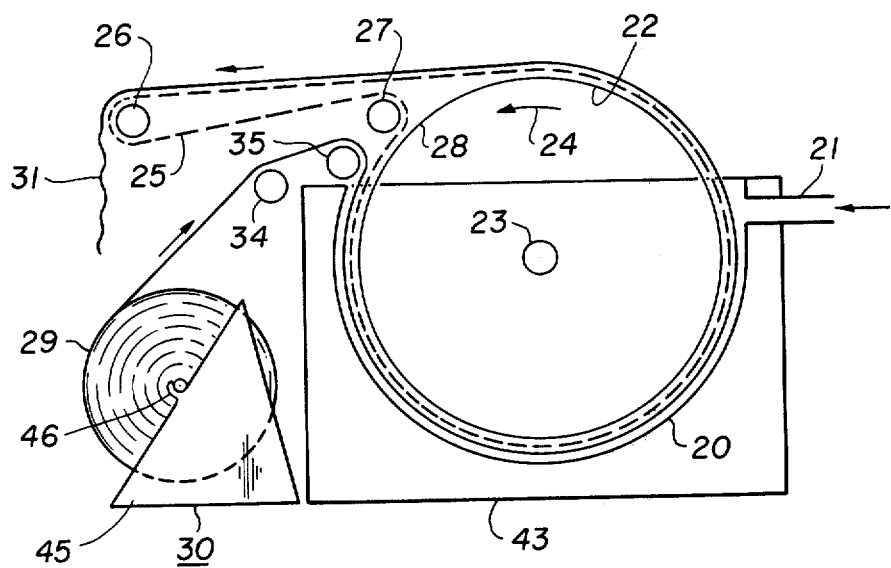
Figure 8:
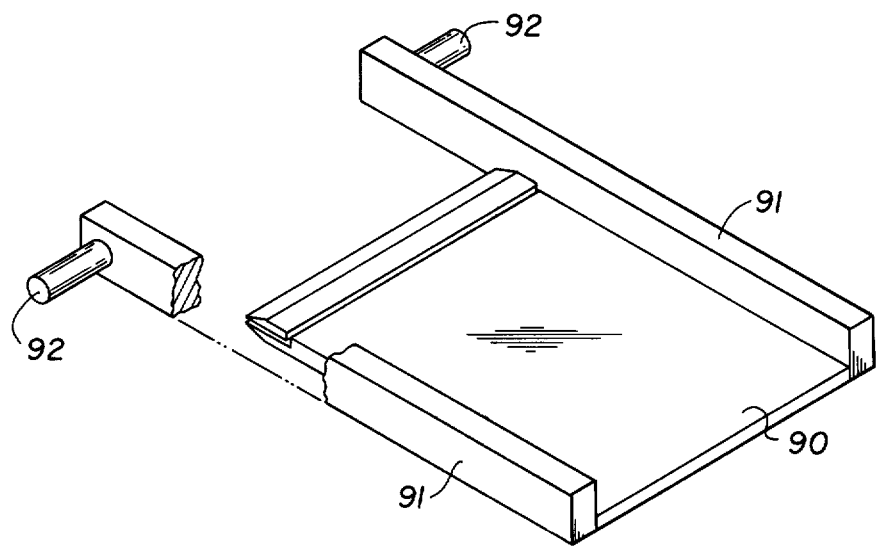
Figure 9:
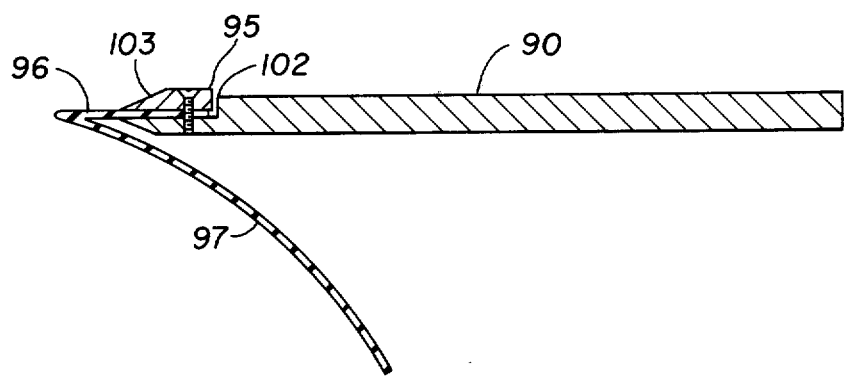

In order that the invention will be more clearly understood, it will now be described in greater detail with reference to the accompanying drawings, wherein:

FIG. 1 is a simplified illustration of a filter apparatus in accordance with the invention, FIG. 2 is a simplified side view of one embodiment of the filter apparatus in accordance with FIG. 1, FIG. 3 is an enlarged view of the bracket assembly of the filter apparatus of FIG. 2, FIG. 4 is an enlarged top view of the guide assembly of the filter apparatus of FIG. 2, FIG. 5 is a cross sectional view of a portion of a drum assembly of one form of a drum that may be employed in the apparatus in accordance with the invention, FIG. 6 is a cross sectional view of the drum assembly of FIG. 5 taken along the lines 6—6, FIG. 7 is a cross sectional view of a portion of a further form of a filter drum that may be employed in the apparatus of the invention, FIG. 8 is a perspective view, partially cut away, of a stripping assembly that may be employed in the filter apparatus of FIG. 2, FIG. 9 is a cross sectional view of a portion of the stripping assembly of FIG. 8, and further illustrating a cover extension for covering the exposed portion of the drum, FIG. 10 is a simplified illustration of a modification of the roll positions in a filter apparatus in accordance with the invention, FIG. 11 is a simplified illustration of a modification of the arrangement of FIG. 1, in which the supply roll is disposed at the opposite side of the filter apparatus, and FIG. 12 is a perspective illustration of a typical filter apparatus in accordance with the invention.

Referring now to the drawings, and more in particular to FIG. 1, therein is illustrated diagrammatically a filter apparatus in accordance with the invention. The apparatus includes a tank 20 having an inlet 21 for receiving a slurry to be filtered. A drum 22 is mounted for rotation about an axis 23, as indicated by the arrow 24. The lower portion of the drum extends into the tank 20, so that a portion of the peripheral surface of the drum is immersed in the slurry. The outer peripheral surface of the drum is perforated.

An endless carrier web 25 is positioned to closely surround a substantial portion of the perforate outer surface of the drum, including the portion thereof immersed in the slurry. The web 25 extends from the drum 22 to a roller 26 spaced from the upper edge of the tank wall, and thence to a roller 27 adjacent the drum above the tank wall. In the direction of rotation of the drum as indicated by the arrow 24, the web thus is separated from the drum at the top portion thereof, moves generally horizontally to the roller 26, passes downwardly around the outside of the roller 26, and thence is returned to the surface of the drum 22 by passing around the roller 27. It will be apparent that a portion 28 of the drum between the roller 27 and the point at which the web 25 leaves the drum is thus exposed.

A roll 29 of a filter media, such as newsprint, is positioned adjacent the tank, for example, on a support 30. In the embodiment of the invention illustrated in FIG. 1, the filter media 31 from the roll 29 is passed under the tank by way of a pair of rollers 32 and 33, thence passes upwardly to a roller 34 spaced from the top of the tank so that the filter media is held from contact with the outer tank wall. From the roller 34 the filter media passes to a roller 35 adjacent the drum, and is urged into contact with the outer surface of the carrier web by the roller 35. The filter media 31 is then carried downwardly on the carrier web through the slurry in the tank 20, and is separated from the drum with the carrier web at the top of the drum, to follow the generally horizontal course of the web between the drum 22 and roller 26. The filter media separates from the carrier web at the roller 26, and is discarded.

A suction force, for example, for a vacuum pump 40 is supplied to the interior of the drum 22, for example by way of conduit 41 extending to the axis of the drum, so that the liquid in the tank is drawn through the filter media 31 and carrier web 25 into the drum 22, with the solid materials being deposited on the outer surface of the filter media. The filtered liquid material is thence drawn by way of a conduit 41 to an outlet 42 from the pump 40. The filter media 31 carrying the solid material from the slurry is thus withdrawn from the tank, and carried by the carrier web 25 for disposal at a position remote from the tank.

The rectangular outline 43 illustrated in FIG. 1 denotes a suitable frame for holding the tank.

In the diagrammatic illustration of the invention as shown in FIG. 1, it is apparent that the suction force within the drum 22 is also active on the exposed portion 28 of the drum. Hence, as will be apparent in the following paragraphs, means are provided for blocking the action of suction forces on this exposed portion of the drum.

The holder 30 for the roll 29 of filter media has generally triangular shaped end plates 45 (only one of which is shown), with suitable holding means 46 on the inclined surfaces thereof away from the tank. The holding means 46 may be retractable to permit the roll 29 to be rolled up the side of the supports, and then clamped by the holding means 46 when the axis of the roll attains the desired height. This arrangement facilitates the loading of the paper rolls, since such rolls may be exceedingly heavy.

It will be particularly noted that the standoff roll 34 holds the filter media away from the tank 20. In the filter apparatus of U.S. Pat. No. 3,791,527, the filter media is directed along the tank wall. It has been found, however, in some instances, that condensation and moisture on the tank wall may weaken the filter media undesirably before it is directed against the screen belt. This problem is avoided by the provision of the paper standoff roll 34.

A particularly suitable arrangement for mounting the paper and screen belt directing rolls as shown in FIG. 1 is illustrated in FIGS. 2–4. As shown in these figures, a pair of brackets 50 are provided with flanges 51 to enable the mounting of the brackets 50 in a fixed position on the top wall 52 of the tank. The brackets 50 extend from a position generally above the center of the drum 22, to a position spaced from the sides of the tank. A slot 53 is provided in the ends of the brackets 50 away from the tank, and a channel 54 is fixed to the end of the brackets covering the slots 53. Housings 55 are slidably mounted in the slots 53, the positions of the housings 55 being adjustable by means of threaded connection bolts 56 extending through threaded apertures in the channels 54 and held for rotation in the housings 55. The threaded bolts 56 may be provided with handles 57 to permit adjustment of the position of the housings. The discharge roll 26 is journaled for rotation in the housings 55.

The brackets 50 are provided with aligned bearings 60 for holding the paper standoff roll 34, and aligned bearings 61 for holding the paper feed roll 35. The bearings 60 are positioned spaced from the tank wall, for example on projections 62 of the brackets 50, so that the paper is held away from the side of the tank, and is directed to pass from the roll 34 over the top of the tank wall to the roll 35. The belt return roll 27 is journaled for rotation in bearings 63 in the brackets 50.

In order to insure alignment of the carrier web, a fixed shaft 70 may be provided extending between the brackets 50, the shaft 70 carrying suitable fixed guides 71 positioned to engage the sides of the screen belt to insure that it maintains its alignment during operation of the filter apparatus.

As further illustrated in FIG. 2, the paper adjusting roll 33 may be mounted in a suitable adjustable mounting device 72, to permit adjustment of the paper tension.

In some types of filter drums, as illustrated in FIGS. 5 and 6, the suction chamber within the drum is separated into segments, and valving arrangements are provided in order to apply suction forces to only determined areas on the periphery of the drum. For example, the drum may be formed of an outer perforated circumferential wall 80, an inner wall 81 radially spaced inwardly of the wall 80, and annular end walls 82 between the walls 80 and 81, the walls defining an annular suction chamber 83. The annular chamber 83 is divided into a plurality of separate segments by means of radially extending walls 84. Suitable conduit and valving means are provided so that suction force may be removed from any of the segments of the annular chamber at determined angular positions. For example, the rotational shaft 85 of the drum may be hollow, and separately connected by means of suitable hollow supports 86 to the different segments of the annular chamber. A tube 87, adapted to be connected to the vacuum pump, extends into the shaft 85, and is provided with ports 88 aligned with the hollow supports 86, whereby ports 88 are omitted at the angular displacements corresponding to displacements of the drum where the suction force is to be removed from the suction chamber. In the arrangement of FIGS. 5 and 6, the shaft 85 may also serve for rotating the drum during operation of the filter apparatus, for example by means of the chain drive 89.

When a segmented drum of the type illustrated in FIGS. 5 and 6 is employed in the filter apparatus in accordance with FIGS. 1–4, it is apparent that the valving arrangement will be so designed that no suction is applied to the segmented suction chamber aligned with the exposed portion 28 of the drum. By this means, the vacuum within the remaining sections of the drum is not lost, and no forces are exerted upon the screen belt and paper as it is withdrawn from the drum, so that smooth withdrawal of the screen belt and paper may be effected.

While the drum arrangement illustrated in FIGS. 5 and 6 is advantageous in many situations, it does require the use of a relatively complex valving arrangement. Thus, in the usual arrangement of this type of drum in a filter apparatus, the axis of the drum is generally positioned above the top wall of the tank, in order to avoid the necessity for immersing valving components within the slurry. As a consequence, such arrangements generally are employed with less than one-half of the surface of the drum extending into the slurry.

In a further type of drum that may be employed in the filter apparatus in accordance with the invention, as illustrated in FIG. 7, the annular suction chamber 83 is defined by the outer peripheral wall 80, the inner wall 81 and the end walls 82 as disclosed in the arrangement of FIGS. 5 and 6. Further, the rotational shaft 85 of the drum may be hollow, and connected to the annular chamber 83 by way of hollow supporting and suction ducts 86. In this arrangement, however, no section walls are provided in the chamber 83, so that the suction forces continually act on the entire outer peripheral wall 80. Consequently, no valving arrangements for suction are required. This type of drum may be readily operated with its axis immersed in the slurry, since no complicated valving arrangements are required.

When a drum of the type illustrated in FIG. 7 is employed in the filter apparatus in accordance with FIGS. 1–4, it is apparent that some means must be provided for avoiding loss of suction pressure from the exposed area 28 of the drum, and it is further necessary to provide means for stripping the screen belt and paper from the drum since the suction forces will be active at all portions of the surface of the drum.

In order to enable use of the filter apparatus of the invention, as shown in FIGS. 2–4, with the non-segmented drum of the type illustrated in FIG. 7, an apron assembly is pivotally mounted between the brackets 50. Referring to FIGS. 3, 4 and 8, the apron assembly is comprised of a flat plate 90 forming an apron, the apron 90 being affixed to a pair of side support bars 91. The side support bars 91 extend beyond one end of the apron 90, and are provided at the extended portions thereof with outwardly directed pivotal arms 92. As more clearly seen in FIGS. 3 and 4, the pivotal arms 92 extend through bearing plates 93 mounted in the brackets, the positions of the pivotal arms 92 being fixed by means of collars 94 affixed to the ends of the shafts extending through the bearing plates 93. As shown in FIG. 3, the apron 90 has a lower position just beneath the return run of the screen belt from the drum to the discharge roll 27. Referring to FIGS. 8 and 9, the end of the apron 90 toward the pivotal arms 92 is provided with a clamp 95 and a stripping plate 96 is held in the clamp 95 to extend into engagement with the surface of the drum, the plate 96 serving as a knife edge to strip the screen belt 25 from the drum and onto the top of the apron plate 90. An arcuate sealing plate 97 is provided extending downwardly from the plate 96, as illustrated in FIG. 9, and this plate 97 extends into close engagement with the exposed area of the drum. The apron assembly is pivotally mounted, and may thus be swung upwardly out of engagement with the drum and screen belt. In order to fix the lower position of the apron plate, as illustrated in FIGS. 3 and 4, a bracket 100 may be provided extending inwardly from one of the brackets 50, a threaded bolt 101 extending through the bracket 100 to engage one of the side support bars 91 of the apron assembly at the desired adjustable lowermost position thereof.

As further illustrated in FIG. 9, the end of the apron 90 towards the pivotal arms may be bevelled at its lower edge, and provided with a recess 102 at its upper edge. The clamp 95 thus may be in the form of a bar 103 held by suitable screws in the recess 102, to clamp the stripping plate 96 in place.

The apron assembly is completely readily removable from the filter apparatus. Thus, the collars 94 may be removed from the ends of the pivotal arms 92, the pivotal arms being sufficiently long that their sidewise movement thus enables the ready removal of the apron assembly.

In a further embodiment of the invention as illustrated in FIG. 10, the screen belt is directed around the outer periphery of the drum 22 by means of the discharge roll 26 and the belt return roll 27 as illustrated in FIG. 10, and further by means of an additional roll 110. In this embodiment the filter media is fed to the belt return roll 27 under the screen belt, whereby a separate paper feed roll is not provided in this arrangement. It will be apparent, of course, that further arrangements of the rolls may be provided in accordance with the invention.

In the arrangement of FIG. 1, the supply roll 29 of filter media was placed on the side of the tank opposite the discharge of the waste paper. This arrangement generally simplifies the loading of the supply roll onto the stand 30, and also obviates the requirement for any baffling to protect the supply roll from liquids at the discharge end of the apparatus. It will be apparent, of course, that alternatively the supply roll 29 may be placed at the opposite end of the apparatus, as illustrated in FIG. 11, beneath the horizontal extension of the web. In this case it may of course be necessary to provide suitable baffling to protect the supply roll, as well as means for directing the end of the filter media to be disposed away from the supply roll.

A typical example of a filter apparatus in accordance with the invention is illustrated in FIG. 12. In this arrangement, the support 30 for the supply roll 29 is comprised of a pair of triangular vertically oriented plates 45. A jack screw 120 is mounted for rotation along the sides of the support 45 away from the filter apparatus, for example in support bearings 121 and 122 affixed to the sides of the support 45. A turning handle 123 is provided on the upper end of the jack screw 120. A roll holder 124 is threaded onto the jack screw, so that rotation of the handle 123 enables the support 124 to be moved upwardly and downwardly. It will be understood, of course, that a similar jack screw arrangement is provided on the support at the opposite support for the roll 29 that does not appear in FIG. 12. In loading the apparatus, the jack screw is rotated by means of a handle 123 to lower the support 124 to a position so that the roll 29 can be merely rolled along the floor into engagement with the support 124. Then, the handle 123 on each side of the support apparatus 30 is rotated to lift the roll to the desired height.

In the arrangement of FIG. 12, the frame for the tank is comprised of a plurality of vertical structural members 130 and suitable cross supports 131 arranged to support the end walls 132 of the tank. The side walls 133 of the tank extend between the end walls 132 and are welded or otherwise suitably affixed thereto.

A bracket 140 is provided on each side of the filter apparatus, for example affixed to the vertical supports 130, for holding a support 149 for the drum 147. Thus, the shaft 150 of the drum extends through the tank wall, and is supported by the support bearings 149. A motor and gear assembly 143 for rotating the drum is mounted on a suitable support 142 rigidly affixed with respect to the side of the tank, and a sprocket wheel 152 on the motor assembly drives a sprocket wheel 141 on the shaft 150 by way of a chain drive 144.

A motor 145 is also mounted on the support 142 for driving a vacuum pump assembly 146, which is connected by suitable means to the suction chamber of the drum as above discussed. For example, the assembly 146 may be coupled to suitable rotary seals at the shaft of the drum.

As further illustrated in FIG. 12, a suitable container 148 may be positioned below the discharge roll for receiving the filter media for disposal.

While the invention as above described has referred to the drum as incorporating an annular single or segmented chamber, it is of course within the scope of the invention to provide a drum in which the chamber substantially fills the drum.

It will be understood that various changes and modifications may be made by those skilled in the art in the particular features of the apparatus which has been described above for illustrative purposes without departing from the scope of the invention as defined by the following claims.

What is claimed is:

1. A filter apparatus for separating solids from a slurry, comprising a tank having an inlet and an outlet for said slurry, a rotary drum having a substantially horizontal axis and extending into said tank for partial immersion into the slurry, the drum having a cylindrical peripheral wall with perforations therein, the peripheral wall defining the outer wall of a suction chamber in the drum, an endless carrier web, carrier and guide means mounted above said tank and comprising a plurality of rollers positioned to guide said endless carrier web to surround a substantial portion of the peripheral wall of the drum and to extend substantially horizontally from the upper portion of said drum to a position remote from said drum, whereby only a small exposed portion of the drum is uncovered by the carrier web in a region above the slurry, a supply means including a roll of a disposable filter media, means continuously feeding the disposable filter means from said roll to overlie the carrier web around said substantial portion of the peripheral wall of the drum so that the filter media overlies the web on the drum at least in the part thereof immersed in the slurry and overlies said web on a horizontal portion thereof extending from said drum to said remote position, said feeding means comprising roll means positioned to continuously hold said filter media away from contact with the outside of said tank, suction means continuously operable within said suction chamber to keep the filter media and web wrapped therearound pressed against said peripheral wall and to cause the solids from the slurry to separate onto the filter media as the liquid of the slurry passes through the filter media and carrier web and through said perforations for discharge from the drum, and means for inhibiting loss of vacuum in the drum by way of said exposed portion of the drum.

2. The filter apparatus according to claim 1 wherein said carrier and guide means includes a pair of rigid parallel bracket means affixed to, and extending beyond opposite walls of said tank, said rollers being rotatably mounted between said brackets with axes parallel to the axis of said drum and comprising a first roller spaced from said drum at said remote position for receiving said web as it moves off of said drum, and a second roll adjacent said exposed portion of the drum for directing said web onto said drum.

3. The filter apparatus according to claim 2 in which a slot is formed in an end of each of the brackets extending from the wall of said tank, said first roll having its ends slidably mounted in the slots of said brackets, and further including means for adjusting the tension on the web comprising adjustment means mounted on the ends of said brackets for controlling the position of said first roll within said slots.

4. The filter apparatus according to claim 1 in which said suction chamber is in the form of a continuous chamber extending under the surface of the peripheral wall of the drum, and wherein the means inhibiting loss of vacuum in the drum comprises an arcuate plate, means mounting said arcuate plate to cover said exposed portion of said drum, and further including stripping means positioned to detach said web from the drum at one side of said exposed portion.

5. The filter apparatus according to claim 4 in which said arcuate plate comprises a flexible strip of material having a sharp bend therein, said bend forming the stripping means.

6. The filter apparatus according to claim 1 in which the chamber in the drum is segmented, and wherein the means inhibiting loss of vacuum in the drum comprises valve means for inhibiting suction pressure in any segment of the drum adjacent said exposed portion.

7. The filter apparatus according to claim 1 in which said supply means is positioned at one side of said tank and said carrier and guide means is mounted at the top of said tank to extend beyond the opposite side of said tank, further comprising guide means for directing said disposable filter media underneath said tank and thence upwardly to said carrier and guide means.

8. The filter apparatus according to claim 2 wherein said carrier and guide means further comprises means for inhibiting movement of said web parallel to the axis of said drum, comprising a shaft mounted between said brackets, and plate means affixed to said shaft and positioned to engage the edges of said web.

9. The filter apparatus according to claim 2 in which the chamber in the drum is a continuous chamber extending under the peripheral wall of the drum, further comprising an apron plate pivotally mounted between said brackets and carrying stripping knife means engageable with the drum in one position of the apron plate for detaching said web from said drum adjacent one side of said exposed portion, and said means inhibiting loss of vacuum in the drum comprises an arcuate plate affixed to the stripping knife means and extending around said exposed portion.

10. The filter apparatus according to claim 2 wherein said roll means of said feeding means comprises a roll rotatably mounted between said brackets for guiding said filter media away from the outer walls of said tank.

11. The filter apparatus of claim 1 further comprising support stand means for supporting said roll of disposable filter media, said support stand means comprising a pair of spaced apart stands having aligned inclined surfaces, and jack screw means on said inclined surfaces for supporting the axis of said roll of filter media.

* * * * *